United States Patent [19]

Schimmel et al.

[11] 4,410,687

[45] Oct. 18, 1983

[54] POLYESTER DISPERSANTS FOR COATING COMPOSITIONS

[75] Inventors: Karl F. Schimmel, Verona; Michael A. Traficante, Pittsburgh; Rostyslaw Dowbenko, Gibsonia, all of Pa.

[73] Assignee: PPG Industries, Inc., Pittsburgh, Pa.

[21] Appl. No.: 445,314

[22] Filed: Nov. 29, 1982

[51] Int. Cl.³ .............................................. C08G 63/48
[52] U.S. Cl. .................................. 528/295.5; 524/832;
 524/878; 525/173; 525/176; 525/297
[58] Field of Search ........................... 524/878, 832;
 528/295.5, 297; 525/438, 445, 173, 176

[56] References Cited

U.S. PATENT DOCUMENTS

| | | | |
|---|---|---|---|
| 3,001,961 | 9/1961 | Armitage et al. | 528/295.5 X |
| 3,379,548 | 4/1968 | Jen | 106/245 |
| 3,437,615 | 4/1969 | Hanson | 528/295.5 X |
| 3,457,206 | 7/1969 | Tonner | 260/22 |
| 3,551,367 | 12/1970 | Gasper et al. | 528/295.5 |
| 3,600,345 | 8/1971 | Levine et al. | 525/176 X |
| 3,838,106 | 9/1974 | Shuki et al. | 528/297 |
| 3,920,597 | 11/1975 | Nicks et al. | 260/22 R |
| 3,940,353 | 2/1976 | Martorano | 525/176 X |
| 4,009,132 | 2/1977 | Furukawa et al. | 524/878 X |
| 4,200,560 | 4/1980 | Kubo et al. | 528/297 X |

OTHER PUBLICATIONS

Polyethylene Glycol Alkyds–Modern Paint and Coatings, Oct. 1978, pp. 123–124.

*Primary Examiner*—Lucille M. Phynes
*Attorney, Agent, or Firm*—H. Lawrence Jones; Charles R. Wilson

[57] ABSTRACT

A polyester resin has an oxyalkylene content of from about 40 percent to about 75 percent. The polyester resin is especially useful as a pigment dispersant in coating compositions. Such compositions can be formulated without the need for conventional low molecular weight dispersants and surfactants which oftentimes adversely affect the film properties of the applied compositions.

26 Claims, No Drawings

POLYESTER DISPERSANTS FOR COATING COMPOSITIONS

The subject invention relates to pigment dispersants and coating compositions containing the pigment dispersants. More particularly, the dispersants are polymeric in nature and are most useful for wetting and stabilizing pigments in latex coating compositions.

BACKGROUND OF THE INVENTION

Pigmented coating compositions are useful for their aesthetic as well as protective features. The coating compositions contain a film-forming resin and a pigment dispersed in a liquid carrier. It is important that the pigment be satisfactorily dispersed throughout any film which results from the application of the coating composition. Accordingly it is imperative that the pigment be well dispersed throughout the liquid coating composition. Normally the pigment to be used is first dispersed in a liquid with a dispersant, sometimes referred to as a grinding aid. The resulting dispersion is then mixed with the main film-forming resin of the composition and any other necessary components to produce the final coating composition.

A large number of different dispersants have been used in the manufacture of pigmented coating compositions. The dispersants have typically been low molecular weight surfactants and in a limited sense polymeric materials, all of which are capable of dispersing the pigment in a liquid carrier. A problem which has been widely experienced with the low molecular weight materials is their tendency to exude from the painted film after prolonged weathering. This can result in an undesirable appearance. Another problem which has been experienced with the conventional dispersants has been their tendency to cause the paint film to be tacky. Sometimes prolonged aging will remove this problem; however the problem manifests itself mainly with freshly painted film around windows and doors which must be closed a short time after being painted. The tackiness of the paint film can result in the window or door being stuck to its frame.

There now have been found dispersants based on polymerization products which contain a high oxyalkylene content. Such dispersants are useful for dispersing pigments which can then be used in resin containing coating compositions without contributing to film tack.

As used herein all percentages and ratios are by weight unless otherwise indicated.

SUMMARY OF THE INVENTION

Dispersants useful in coating compositions are based on a polyester resin having a high oxyalkylene content. The resins consist essentially of (a) from about 40 percent to about 75 percent of oxyalkylene units wherein each unit has two or three carbon atoms, and (b) from about 25 percent to about 60 percent of units provided by a polyester resin or components which when reacted together with the component providing the oxyalkylene units form a polyester resin. The dispersants of the invention are especially adapted for dispersing pigments to be used in coating compositions. Latex coating compositions containing the dispersants of the invention are especially useful.

DETAILED DESCRIPTION OF THE INVENTION

The invention herein described relates to dispersants and coating compositions containing the dispersant, pigment, film-forming resin and a liquid carrier. Dispersants and coating compositions of this invention are described in more detail in the following paragraphs.

The dispersants described herein are particularly characterized in having a high oxyalkylene content. That is, from about 40 percent to about 75 percent of the dispersant is represented by the oxyalkylene units. The balance of the dispersant, i.e., from about 25 percent to about 60 percent, is units provided by a polyester resin or components which when reacted together with an oxyalkylene source form a polyester resin. The dispersants can be made by different methods. One method involves reacting a polyester resin with a compound providing oxyalkylene units. Another method comprises blending together polyester resin components and the source of oxyalkylene units and reacting the blend so as to form a polyester resin. In the first method, a carboxyl rich polyester resin is selected. Such resins are derived from the reaction of a dicarboxylic acid or anhydride with a polyhydric compound. Polycarboxylic acids such as phthalic acid, maleic acid, fumaric acid, isophthalic acid, terephthalic acid, hexahydrophthalic acid, succinic acid, dodecylsuccinic acid, nadic acid, adipic acid, azelaic acid, sebacic acid, dimer acid, as well as adhydrides of such acids where they exist are useful. Preferred are phthalic acid, isophthalic acid, terephthalic acid, hexahydrophthalic acid, succinic acid, dodecylsuccinic acid, maleic acid, nadic acid, their anhydrides where they exist, and mixtures thereof. Polyhydric alcohols which are reacted with the polycarboxylic acid or anhydride include glycerol, trimethylolethane, trimethylolpropane, pentaerythritol, sorbitol, mannitol, ethylene glycol, diethylene glycol, 2,3-butylene glycol and oxyalkylated derivatives thereof. Preferred are pentaerythritol, trimethylolpropane, glycerol, oxylalkylated derivatives and mixtures thereof. Molar ratios of the two reactants are selected so that the resultant polyester resin is carboxyl rich.

In one preferred embodiment, the polyester resin to be reacted with the source of oxyalkylene units is further chemically combined with various drying, semidrying and nondrying fatty acids in different proportions to form a class of polyester resins often referred to as alkyd resins. These polyester resins are produced by reacting the polycarboxylic acid or anhydride and the polyhydric alcohol together with the drying, semi-drying or nondrying fatty acid. The fatty acids are coupled into the resin molecule by esterification during the reaction and become an integral part of the polymer. The fatty acid can be fully saturated or predominantly unsaturated. Suitable acids include coconut, fish, linseed, tung, castor, cottonseed, safflower, soybean and tall fatty acid. Various proportions of the polycarboxylic acid or anhydride, polyhydric alcohol and fatty acid are used to obtain this class of polyester resins. For these resins, a lactone can be used in place of or along with the dicarboxylic acid or anhydride to form the polyester resin.

The source of the oxyalkylene units which is reacted with the above-described polyester resins can be provided by an alkylene oxide, a monoalkoxypolyoxyalkylene alcohol, a polyoxyalkylene glycol or mixtures thereof. The alkylene oxides have 2 or 3 carbon atoms and are illustrated by ethylene oxide, propylene oxide and mixtures thereof. The alcohol and glycol are of low molecular weight typically having a molecular weight of from about 350 to about 2000 as determined by gel permeation chromatography using a polystyrene standard. The monoalkoxypolyoxyalkylene alcohols contain from 1 to 3 carbon atoms in the alkoxy group. These alcohols as well as the polyoxyalkylene glycols have 2 or 3 carbon atoms in each oxyalkylene unit. The preferred monoalkoxypolyoxyalkylene alcohol and polyoxyalkylene glycol are monoalkoxypolyoxyethylene alcohol and polyoxyethylene glycol, respectively. The more preferred monoalkoxypolyoxyethylene alcohols have a molecular weight ranging from about 500 to about 800. These materials are the preferred source of the oxyalkylene units.

Dispersants of the invention according to the first described method are formed by blending the polyester resin together with the source of oxyalkylene units and reacting under pressure and temperature sufficient to form the desired final product. When the source of the oxyalkylene unit comes from the alkylene oxides, atmospheric pressure to about 80 psi and a temperature ranging from about 35° C. to about 180° C. are used. When the oxyalkylene units are provided by the monoalkoxypolyoxyalkylene alcohol or the polyoxyalkylene glycol, less stringent reaction conditions can be used. Thus a temperaure ranging from about 50° C. to about 150° C. is sufficient. Proportions of the reactants are sufficient to provide the dispersant with the requisite units as stated above.

The second method of forming the dispersants in this invention comprises reacting together dicarboxylic acid or anhydride, polyhydric compound, the monoalkoxypolyoxyalkylene alcohol or polyoxyalkylene glycol and optionally the drying oil fatty acid in proportions sufficient to result in the final product having from about 40 percent to about 75 percent of oxyalkylene units. The balance of the dispersant, that is, from about 25 percent to about 60 percent, is provided by the components which react with the oxyalkylene source. The reactants described above with respect to the polyester resin and the oxyalkylene unit source are useful herein as well.

One resin which is particularly useful consists essentially of (a) from about 40 percent to about 75 percent of oxyalkylene units; (b) from about 10 percent to about 30 percent of units provided by the dicarboxylic acid or anhydride; (c) from about 5 percent to about 15 percent of units provided by the polyhydric compound; and (d) from about 10 percent to about 30 percent of units provided by the drying fatty acid. An even more preferred dispersant consists essentially of from about 40 percent to about 60 percent of units provided by the monoalkoxypolyoxyethylene alcohol, from about 15 percent to about 25 percent of units provided by the dicarboxylic acid or anhydride, from about 7 percent to about 12 percent of units provided by the polyhydric compound, and from about 15 percent to about 25 percent of units provided by the drying fatty acid.

The dispersants are especially useful in latex coating compositions. Such compositions consist essentially of water, polymeric resin film-forming material, pigment, and from about 0.1 percent to about 10 percent of dispersant. Generally the pigment and dispersant are first blended together so as to disperse the pigment in a liquid carrier. Thereafter the pigment dispersion is added to the polymeric resin film-forming material and the balance of the composition. The polymeric resin film-forming material used in latex coating compositions are normally acrylic resins. These resins are produced by reacting acrylic compounds such as acrylic acid and methacrylic acid with other copolymerizable ethylenically unsaturated monomers such as acrylic esters, styrene type monomers, e.g., styrene, vinyl toluene, methylstyrene and ethylstyrene.

The balance of the composition comprises a liquid carrier material. The major portion of the liquid carrier is water; however, minor amounts of organic solvents such as hydrocarbons and halogenated hydrocarbons, for example, toluene, xylene, mineral spirits, n-hexane, cyclohexane, chlorobenzene, and perchloroethylene can be used. Conventional additives such as plasticizers, fillers, rheology modifiers and stabilizers are also used.

Coating compositions described herein are applied by conventional coating techniques onto a variety of substrates. Thus the compositions can be applied by spraying, brushing, dipping, flow coating and roll coating. Substrates that can be coated include wood, metals, glass, plastics and wallboard.

The examples which follow are illustrative of the invention. All molecular weights given are determined by gel permeation chromatography using a polystyrene standard.

EXAMPLE I

A dispersant having a high oxyalkylene content resin is made using the following reactants.

| Components | Percent of Resin |
| --- | --- |
| Pentaerythritol | 9.6 |
| Phthalic anhydride | 18.2 |
| Methoxypolyoxyethylene alcohol (1) (average molecular weight = 750) | 51.2 |
| Soya type fatty acid (2) | 21.0 |

(1) Available from Union Carbide Corporation as CARBOWAX 750.
(2) Available from Emery Industries, Inc. as EMERSOL 315.

A reaction vessel is set up with heating means, stirring means, and means for maintaining a nitrogen blanket. The reaction vessel is initially charged with 1474.7 parts of the phthalic anhydride, 4141.5 parts of the methoxypolyoxyethylene alcohol and 1700.7 parts of the soya type fatty acid. Then, under a nitrogen blanket, the reactants are heated to 66° C. over a one hour time period and held at that temperature for an additional hour. Next, 773.5 parts of the pentaerythritol and 9.4 parts of dibutyltin oxide catalyst are added. The vessel is now heated to 110° C. and held there for about 5 hours. Water is continually removed during the 5 hour hold time. An azeotrope reflux means is then installed and 216 parts of xylene is added. The acid value of the reaction mixture at the time of switching to the azeotrope distillation is 32.7. The 110° C. temperature is maintained for about the next 9 hours until the reaction mixture has an acid value of 8.8.

The above reaction mixture is next cut to 89.5 percent solids with 648 parts of ethylene glycol monophenyl ether. The final product has an acid value of 6.7 and a viscosity of 14.9 seconds in a Gardner bubble tube.

The advantages achieved by the use of the above polyester dispersant resin in a coating composition are demonstrated below. Two coating compositions similar in all respects (except one contains the dispersant resin of this invention and the other a conventional dispersant) are formulated in the following manner:

|  | % | |
|---|---|---|
|  | Composition A | Composition B |
| Acrylic latex resin (1) (46.5 percent solids) | 55.8 | 55.8 |
| Polyester dispersant resin | 1.0 | — |
| Pigment dispersant system (2) | — | 1.0 |
| Silica | 3.0 | 3.0 |
| Barium Sulfate | 15.2 | 15.2 |
| Propylene glycol | 5.1 | 5.1 |
| Deionized water | 18.3 | 18.3 |
| Amino methyl propanol | 0.1 | 0.1 |
| Ethylene glycol monophenyl ether | 0.5 | 0.5 |
| Hydroxyethyl cellulose | 0.2 | 0.2 |
| Phenyl mercuric acetate | 0.1 | 0.1 |
| Defoamer (3) | 0.7 | 0.7 |

(1) Available from Rohm & Haas Co. as AC-490 Acrylic Latex Polymer.
(2) A blend of sodium polyacrylate dispersant, potassium salt of polyphosphoric acid ester, and nonylphenoxy poly(ethyleneoxy)ethanol.
(3) Available from Drew Chemical Co. as Drew L-475.

The above compositions are separately tinted with white and black colorants and then tested for viscosity and block resistance. The viscosity of each composition is substantially the same thereby showing the two dispersants are comparable in dispersing pigment. The block resistance of the compositions is determined by (1) making a 3 mil drawdown of each composition on a substrate; (2) air drying the coated substrate for one day at ambient conditions; (3) folding the coated substrate in half so that the coated side is face to face; (4) applying a weight on top of the folded substrate in an amount sufficient to provide 2 lbs./sq. inch for 4 hours; (5) separating the folded substrate; and (6) grading the coatings. Two gradings are done, one for ease of separation and one for defacement of coating. A scale of 0 to 10 is used with 0 being destruction of the substrate itself in trying to pull apart the folded substrate and 10 being no noticeable tackiness. Results of the tests are as follows:

|  | Block Resistance (ease of separation/defacement) |
|---|---|
| Composition A (white colorant) | 10/10 |
| Composition A (black colorant) | 10/10 |
| Composition B (white colorant) | 9/8 |
| Composition B (black colorant) | 0/0 |

The polymeric dispersant resin is comparable to the conventional surfactant system in terms of dispersing pigment as evident from the viscosity measurements of Compositions A and B. However, the dispersant resin does not have an adverse effect on film properties of a coating composition containing it (as demonstrated by the better block resistance found with Compositions A) and is much desired for this reason.

EXAMPLE II

The following components are used to make a dispersant resin of this invention:

|  | Percent of Resin |
|---|---|
| Pentaerythritol | 9.6 |
| Phthalic anhydride | 18.2 |
| Polyoxyethylene glycol (1) (average molecular weight = 1500) | 51.2 |
| Soya type fatty acid (2) | 21.0 |

(1) Available from Union Carbide Corp. as Carbowax 1540.
(2) As used in Example I.

A reaction vessel, equipped as in Example I, is initially charged with 1533.7 parts of the polyoxyethylene glycol, 564.2 parts of the phthalic anhydride and 629.0 parts of the soya type fatty acid. The reaction vessel is heated to 150° C. and held there for 1 hour. Next, 286.5 parts of the pentaerythritol and 3.5 parts of dibutyltin oxide catalyst are charged to the vessel and heated to 230° C. This temperature is maintained for about 2½ hours. The resultant product has an acid value of 41.4.

EXAMPLE III

In a manner similar to that used in Example I, a polyester dispersant resin is made using the following components:

|  | Percent of Resin |
|---|---|
| Propylene oxide derivative of pentaerythritol (1) | 33.6 |
| Phthalic anhydride | 13.4 |
| Methoxypolyoxyethylene alcohol (2) | 37.6 |
| Soya type fatty acid (2) | 15.4 |

(1) Available from BASF Wyandotte as PEP 650.
(2) As used in Example I.

The dispersant resin is made by first reacting the phthalic anhydride, methoxypolyoxyethylene alcohol and soya type fatty acid and then adding the pentaerythritol derivative to the reaction vessel and reacting the mixture until the final product has an acid value of 5.4.

EXAMPLE IV

A low oxyalkylene content polyester resin is made in this example for purposes of comparison with the high oxyalkylene content polyester dispersant resin of this invention. The two resins are made using the same monomers as listed below.

|  | Percent of Resin | |
|---|---|---|
|  | Low Oxyalkylene Content | High Oxyalkylene Content |
| Pentaerythritol | 13.7 | 9.6 |
| Phthalic anhydride | 26.2 | 18.2 |
| Methoxypolyoxyethylene alcohol (1) | 29.9 | 51.2 |
| Soya type fatty acid (1) | 30.2 | 21.0 |

(1) As used in Example I.

The same relative amounts of pentaerythritol, phthalic anhydride and soya type fatty acid are used in each of the resins. The resins are compared by formulating the following coating compositions, tinting them with white colorant, and testing for block resistance:

|  | % | |
|---|---|---|
|  | Composition A | Composition B |
| Acrylic latex resin (1) | 60.6 | 60.6 |
| Low oxyalkylene content polyester resin | 0.9 | — |
| High oxyalkylene content | — | 0.9 |

-continued

|  | % | |
|---|---|---|
|  | Composition A | Composition B |
| dispersant resin |  |  |
| Silica | 5.4 | 5.4 |
| Calcium carbonate | 5.4 | 5.4 |
| Mineral spirits | 1.1 | 1.1 |
| Ethylene glycol | 1.6 | 1.6 |
| Deionized water | 17.6 | 17.6 |
| Amino methyl propanol | 0.1 | 0.1 |
| Ethylene glycol monophenyl ether | 1.1 | 1.1 |
| Hydroxyethyl cellulose | 0.1 | 0.1 |
| Phenyl mercuric acetate | 0.1 | 0.1 |
| Rheology modifier (2) | 5.4 | 5.4 |
| Defoamer (1) | 0.6 | 0.6 |

(1) As used in Example 1.
(2) A urethane polymer made by reacting for each 8 moles polyethylene oxide (M.W. = 8000), 1.5 moles trimethylolpropane, 17.4 moles bis para-isocyanato cyclohexylmethane and 9.2 moles water.

The block resistance of films made from Compositions A and B is determined in the manner described in Example I. Results of the tests are:

|  | Block Resistance (ease of separation/defacement) | |
|---|---|---|
|  | After 1 Day at Room Temperature | After 2 Weeks at 60° C. |
| Composition A | 9/10 | 2/3 |
| Composition B | 9/10 | 9/10 |

The above results show the importance of the oxyalkylene content of the polyester resin. The block resistance readings of the films containing the low oxyalkylene content polyester resin is unacceptable.

What is claimed is:

1. A polyester dispersant resin consisting essentially of:
   (a) from about 10 percent to about 30 percent of units provided by a dicarboxylic acid or anhydride;
   (b) from about 40 percent to about 75 percent oxyalkylene units, provided by (i) an alkylene oxide, said units each having 2 or 3 carbon atoms, (ii) a monoalkoxypolyoxyalkylene glycol wherein the alkoxy unit has 1 to 3 carbon atoms, (iii) a polyoxyalkylene glycol wherein the oxyalkylene units of (ii) and (iii) have 2 or 3 carbon atoms and the glycols have a molecular weight of from about 350 to about 2000, as determined by gel permeation chromatography, using a polystyrene standard, or (iv) mixtures thereof;
   (c) from about 5 percent to about 15 percent of units provided by a polyhydric compound; and
   (d) from about 10 percent to about 30 percent of units provided by a drying oil fatty acid
   wherein said resin is made by first reacting the dicarboxylic acid or anhydride with the compound providing the oxyalkylene units and the drying oil fatty acid and then reacting the resultant product with the polyhydric compound.

2. The polyester dispersant resin of claim 1 wherein the dicarboxylic acid or anhydride is selected from the group consisting of phthalic acid, isophthalic acid, terephthalic acid, hexahydrophthalic acid, succinic acid, dodecylsuccinic acid, maleic acid, nadic acid, their anhydrides where they exist, and mixtures thereof.

3. The polyester dispersant resin of claim 2 wherein the anhydride of the dicarboxylic acid is used.

4. The polyester dispersant resin of claim 3 wherein the oxyalkylene units are provided by the monoalkyloxypolyoxyalkylene alcohol.

5. The polyester dispersant resin of claim 4 wherein the monoalkoxypolyoxyalkylene alcohol contains from 1 to 3 carbon atoms in the alkoxy group and 2 carbon atoms in each oxyalkylene unit.

6. The polyester dispersant resin of claim 5 wherein the monoalkoxypolyoxyalkylene alcohol is monoalkoxypolyoxyethylene alcohol having a molecular weight of from about 500 to about 800.

7. The polyester dispersant resin of claim 5 wherein the polyhydric compound contains at least three hydroxyl groups.

8. The polyester dispersant resin of claim 7 wherein the polyhydric compound is selected from the group consisting of pentaerythritol, trimethylolpropane, glycerol, oxyalkylated derivatives thereof, and mixtures thereof.

9. The polyester dispersant resin of claim 7 wherein the drying oil fatty acid is selected from the group consisting of linseed fatty acid, soya fatty acid, dehydrated castor fatty acid and mixtures thereof.

10. The polyester dispersant resin of claim 9 wherein said resin consists essentially of from about 15 percent to about 25 percent of units provided by the dicarboxylic acid or anhydride, from about 40 percent to about 60 percent of units provided by the monoalkoxypolyoxyethylene alcohol, from about 7 percent to about 12 percent of units provided by the polyhydric compound and from about 15 percent to about 25 percent of the units provided by the drying oil fatty acid.

11. A latex coating composition consisting essentially of water, polymeric resin film-forming material, and from about 0.1 percent to about 10 percent of a polyester dispersant resin containing from about 40 percent to about 75 percent oxyalkylene units, said units each having 2 or 3 carbon atoms.

12. The coating composition of claim 11 wherein the oxyalkylene units in the polyester dispersant resin are provided by (i) an alkylene oxide, (ii) a monoalkoxypolyoxyalkylene alcohol, (iii) a polyoxyalkylene glycol, or (iv) mixtures thereof, where the oxyalkylene units have 2 or 3 carbon atoms and the alcohol and glycol have a molecular weight of from about 350 to about 2000, as determined by gel permeation chromatography, using a polystyrene standard.

13. The coating composition of claim 12 wherein the polyester dispersant resin is made by first forming a polyester resin from a dicarboxylic acid or anhydride and a polyhydric compound and thereafter reacting it with the alkylene oxide.

14. The coating composition of claim 12 wherein the polyester dispersant resin is made by reacting the monoalkoxypolyoxyalkylene alcohol, polyoxyalkylene glycol or mixture thereof with a dicarboxylic acid or anhydride and polyhydric compound.

15. The coating composition of claim 14 wherein the polyester dispersant resin additionally contains units provided by drying fatty acid, semi-drying fatty acid, nondrying fatty acid or a mixture thereof.

16. The coating composition of claim 15 wherein the polyester dispersant resin consists essentially of:
   (a) from about 40 percent to about 75 percent of the oxyalkylene units;
   (b) from about 10 percent to about 30 percent of units provided by the dicarboxylic acid or anhydride;

(c) from about 5 percent to about 15 percent of units provided by the polyhydric compound; and (d) from about 10 percent to about 30 percent of units provided by the drying fatty acid.

17. The coating composition of claim 16 wherein the dicarboxylic acid or anhydride is selected from the group consisting of phthalic acid, isophthalic acid, terephthalic acid, hexahydrophthalic acid, succinic acid, dodecylsuccinic acid, maleic acid, nadic acid, their anhydrides where they exist, and mixtures thereof.

18. The coating composition of claim 17 wherein the anhydride of the dicarboxylic acid is used.

19. The coating composition of claim 18 wherein the oxyalkylene units are provided by the monoalkoxypolyoxyalkylene alcohol.

20. The coating composition of claim 19 wherein the monoalkoxypolyoxyalkylene alcohol contains from 1 to 3 carbon atoms in the alkoxy group and 2 carbon atoms in each oxyalkylene unit.

21. The coating composition of claim 20 wherein the monoalkoxypolyoxyalkylene alcohol is monoalkoxypolyoxyethylene alcohol having a molecular weight of from about 500 to about 800.

22. The coating composition of claim 20 wherein the polyhydric compound contains at least three hydroxyl groups.

23. The coating composition of claim 22 wherein the polyhydric compound is selected from the group consisting of pentaerythritol, trimethylolpropane, glycerol, oxyalkylated derivatives thereof, and mixtures thereof.

24. The coating composition of claim 22 wherein the drying fatty acid is selected from the group consisting of linseed, soya, dehydrated castor fatty acid and mixtures thereof.

25. The coating composition of claim 24 wherein the polyester dispersant resin consists essentially of from about 15 percent to about 25 percent of units provided by the dicarboxylic acid or anhydride, from about 40 percent to about 60 percent of units provided by the monoalkoxypolyoxyethylene alcohol, from about 7 percent to about 12 percent of units provided by the polyhydric compound and from about 15 percent to about 25 percent of the units provided by the drying fatty acid.

26. The coating composition of claim 25 wherein the polymeric resin film-forming resin is an acrylic resin.

* * * * *